V. GALLETTA.
LID FOR CULINARY ARTICLES.
APPLICATION FILED JULY 10, 1916.
1,210,301.
Patented Dec. 26, 1916.
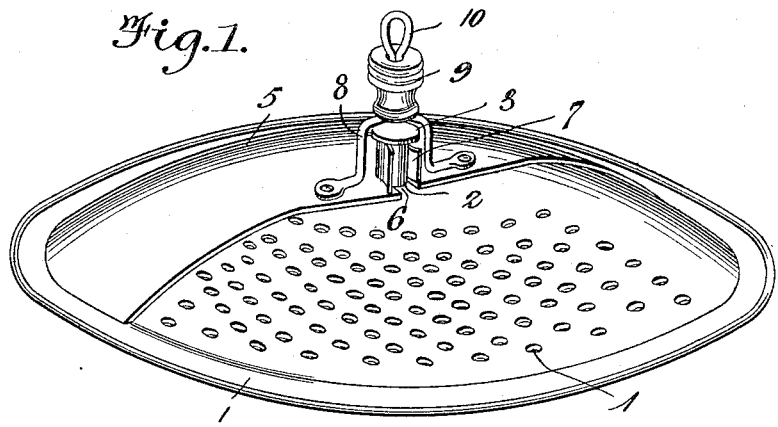
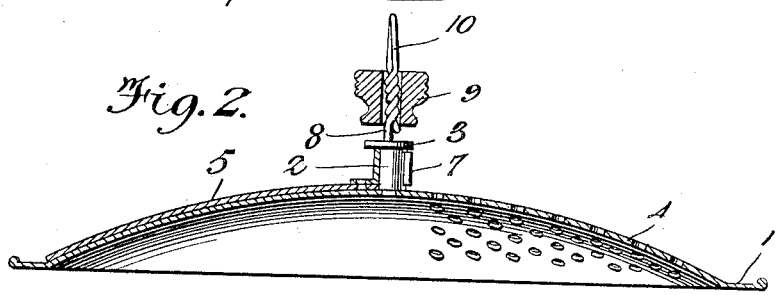
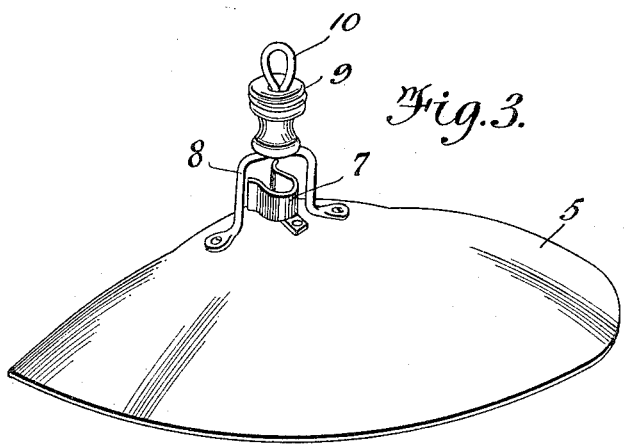
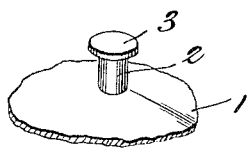
Witness
Frederick W. Ely.
Inventor
V. Galletta,
By Victor J. Evans
Attorney

UNITED STATES PATENT OFFICE.

VINCENZO GALLETTA, OF LONG BEACH, CALIFORNIA.

LID FOR CULINARY ARTICLES.

1,210,301.  Specification of Letters Patent.  Patented Dec. 26, 1916.

Application filed July 10, 1916.  Serial No. 108,510.

*To all whom it may concern:*

Be it known that I, VINCENZO GALLETTA, a citizen of the United States, residing at Long Beach, in the county of Los Angeles and State of California, have invented new and useful Improvements in Lids for Culinary Articles, of which the following is a specification.

This invention relates to an improvement in the lids or covers of culinary articles, the primary object being to provide the lid of a cooking utensil with openings forming steam outlets for aproximately one-half of the area of the said lid and to arrange upon the lid a cover plate which can be turned to close the openings when steam from the boiling water is to be retained in the vessel and likewise turned to uncover the said openings to permit of the escape of steam therethrough from the said vessel.

It is a further object of the invention to produce a covering plate for reticulations in a lid for a cooking vessel which is so constructed and arranged as to permit of the same being positioned upon the vessel or removed therefrom, and whereby the ordinary lids for cooking vessels may be provided with steam cutlets or vents and may have arranged thereon a covering plate for said outlets or vents.

It is a still further object of the invention to produce an article of this class which can be easily and quickly positioned upon the handle of any ordinary vessel lid and which when so arranged will tightly engage with the lid to effectively close the openings in the lid and which may be readily turned to uncover the said openings when desired.

It is a still further object of the invention to produce an article of this class which shall embody the desirable features of cheapness, simplicity and thorough efficiency.

With the above and other objects in view the improvement resides in the construction, combination and arrangement of parts set forth in the following specification and falling within the scope of the appended claims.

In the drawing: Figure 1 is a perspective view of an ordinary vessel lid having apertures in approximately one-half the area thereof providing steam outlets, the said lid being provided with a closure plate for the outlets constructed in accordance with the present invention and said closure plate being moved to uncover certain of the openings, Fig. 2 is a central longitudinal sectional view through the same, Fig. 3 is a perspective view of the closure plate detached, and Fig. 4 is a perspective view of the central portion of the utensil lid.

In the drawing the numeral 1 designates the lid for any ordinary cooking utensil. The lid is centrally provided with a cylindrical stud 2 having its outer end provided with a flange 3, the said flange and stud providing the handle for the lid. The lid 1, for less than one-half of its area and to one side of the handle is provided with concentrically arranged apertures 4, and these apertures provide outlets for the steam generating from the cooking utensil.

The improved closure plate is broadly designated by the numeral 5 and includes a member which in plan is of a formation approximately similar to one-half of a circle, being of a size to fully close all of the apertures 4 of the lid 1 when the plate 5 is arranged upon the lid and moved over the said apertures. The closure plate 5 may have its central portion extending beyond its inner or straight edge and is provided at its center with a substantially U-shaped slot or opening 6 of a size to snugly receive the stud portion 2 of the handle of the lid. Surrounding the slot 6 and having its central portion secured to the plate 5 is a substantially U-shaped spring 7, the ends of said spring being flared outwardly in opposite directions whereby to provide a flaring mouth to permit of the ready insertion of the spring over the stud and the frictional engagement of the arms of said spring with the opposite sides of the stud. The spring is of a width approximately equaling the length of the stud 2, so that the said spring will contact with the underface of the flange 3 of the handle for the lid.

Disposed above and straddling the spring 7 is a substantially inverted U-shaped resilient element 8 which has its ends connected to the closure plate 5 at the opposite sides of the spring 7 as clearly shown in the drawings, and the central portion of this resilient member 8 is extended vertically and engages in the bore of the knob 9. The connected end of the vertical portion of the resilient member 8, after the knob 9 has been arranged thereon, is widened by the aid of a suitable instrument providing the same with what may be termed an eye 10, and this eye provides means for retaining the knob upon the element 8 as well as providing a hanger to receive a suitable supporting element whereby the closure plate may be suspended when not in use or whereby both the lid and closure plate may be suspended when the closure plate remains a fixture upon the lid.

The operation of the device will, it is thought, be perfectly apparent it being merely necessary to revolve the closure plate upon the lid to bring the same over or away from the apertures 4 so that when the said plate covers the apertures steam will be held within the cooking vessel and when the said plate is brought to uncover the apertures the steam is free to escape from the vessel.

Having thus described the invention, what I claim is:

1. The combination with a lid for cooking utensils having apertures to one side of its center and being centrally provided with a handle comprising a flanged stud which is cylindrical in cross section, of a plate covering the apertures in the lid, said plate having one of its edges centrally provided with a slot to receive the stud, a spring centrally secured to the plate and surrounding the slot and having its ends disposed at the opening in the slot, said spring adapted to frictionally engage with the stud to contact with the flange of the said stud to removably sustain the plate upon the lid.

2. The combination with a lid for cooking utensils having apertures to one side of its center and its said center provided with a handle comprising a cylindrical stud having its outer edge flanged, of a plate for closing the apertures of the lid, said plate having one of its edges centrally slotted and a rounded split spring centrally secured to the plate and surrounding the slot and having its ends flared away from each other and arranged at the opening of the slot whereby the arms of the spring will frictionally contact with the opposite sides of the stud and underlie the flange of the said stud, a resilient element straddling the spring and having its ends secured to the plate, the central portion of the said resilient element being extended outwardly and provided with an eye, and a knob member arranged upon the said extension of the said element.

In testimony whereof I affix my signature.

VINCENZO GALLETTA.

Copies of this patent may be obtained for five cents each, by addressing the "Commissioner of Patents, Washington, D. C."